United States Patent
Mitsuoka et al.

(10) Patent No.: US 6,625,109 B1
(45) Date of Patent: Sep. 23, 2003

(54) NEAR-FIELD OPTICAL HEAD AND HEAD SUPPORT ASSEMBLY HAVING NEAR-FIELD OPTICAL HEAD

(75) Inventors: Yasuyuki Mitsuoka, Chiba (JP); Norio Chiba, Chiba (JP); Nobuyuki Kasama, Chiba (JP); Takashi Niwa, Chiba (JP); Kunio Nakajima, Chiba (JP); Kenji Kato, Chiba (JP); Manabu Oumi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/423,849

(22) PCT Filed: Mar. 19, 1999

(86) PCT No.: PCT/JP99/01377

§ 371 (c)(1),
(2), (4) Date: Apr. 19, 2000

(87) PCT Pub. No.: WO99/49463

PCT Pub. Date: Sep. 30, 1999

(30) Foreign Application Priority Data

Mar. 24, 1998 (JP) ............................................. 10-075419
Jan. 5, 1999 (JP) ............................................. 11-000354

(51) Int. Cl.[7] .......................... G11B 7/00; G11B 15/64; G11B 17/32; G11B 7/12
(52) U.S. Cl. ............................................................ 369/300
(58) Field of Search .................. 369/300, 95, 112.01, 369/124.02, 124.03, 124.04, 13.33, 13.32, 13.24, 13.01

(56) References Cited

U.S. PATENT DOCUMENTS

| 4,605,977 | A | * | 8/1986 | Matthews | 360/234.7 |
|---|---|---|---|---|---|
| 5,497,359 | A | | 3/1996 | Mamin et al. | 369/44.15 |
| 5,689,480 | A | * | 11/1997 | Kino | 369/14 |
| 6,069,853 | A | * | 5/2000 | Novotny et al. | 369/13.33 |
| 6,078,471 | A | * | 6/2000 | Fiske | 360/254.2 |
| 6,275,467 | B1 | * | 8/2001 | Wang et al. | 369/300 |

FOREIGN PATENT DOCUMENTS

| EP | 0242597 | | 10/1987 |
|---|---|---|---|
| EP | 0551814 | | 7/1993 |
| EP | 0652414 | | 5/1995 |
| EP | 0762566 | | 3/1997 |
| EP | 0860726 | | 8/1998 |
| JP | 1-307934 | * | 12/1989 |
| JP | 2-91831 | * | 3/1990 |
| JP | 6-176410 | * | 6/1994 |
| JP | 8-82633 | * | 3/1996 |
| JP | 8-106646 A | * | 4/1996 |
| JP | 9-22538 | * | 1/1997 |
| JP | 9-231608 | * | 9/1997 |
| JP | 10-170523 | * | 6/1998 |
| JP | 10-197542 | * | 7/1998 |
| JP | 10-269614 | * | 10/1998 |

OTHER PUBLICATIONS

Betzig, E. et al, "Near–Field Optics: Microscopy, Spectroscopy, and Surface Modification Beyond the Diffraction Limit", Jul. 10, 1992, Science, v. 257, p. 189–195.*

* cited by examiner

Primary Examiner—Julie Anne Watko
(74) Attorney, Agent, or Firm—Adams & Wilks

(57) ABSTRACT

A near-field optical head comprises a slider body and a cantilever arm extending from the slider body and having a contact pad at an end portion thereof for contacting a surface of a recording medium. The slider body has an air bearing surface which interacts with a film of air moving in a direction adjacent to the surface of the record medium to generate a lift force to fly the slider body over the surface of the record medium and urge the contact pad of the cantilever arm into contact with the surface of the record medium.

38 Claims, 4 Drawing Sheets

ILLUMINATION LIGHT

NEAR-FIELD OPTICAL HEAD AND HEAD SUPPORT ASSEMBLY HAVING NEAR-FIELD OPTICAL HEAD

TECHNICAL FIELD

The present invention relates to a near-field optical head, and more particularly, and to a near-field optical head in which near-field microscope technology is applied to a head of a recording apparatus represented by a hard disk or the like.

BACKGROUND OF THE INVENTION

According to a near-field microscope provided with an optical probe utilizing near field light, a sample can be observed with a high resolution equal to or higher than a diffraction limit of light. According to such a near-field microscope, as an end portion of the optical probe opposed to a sample, there is used a very small aperture provided at a sharpened distal end of an optical fiber or a very small aperture provided at a tip of a silicon substrate which is formed by carrying out anisotropic etching or there is used a very small protrusion constituted by the sharpened distal end of the optical fiber or on the tip.

Meanwhile, there has been proposed a near-field optical memory disclosed in, for example, E. Betzig et al., Science 257, 189 (1992), to which such an observation principle is applied. According to such an example of application, a very small aperture or a very small protrusion formed at a recording or reading head needs to be proximate to a surface of a record medium or to be brought into contact with the surface within a wavelength of illumination light which is propagating light.

In many cases of a recording/reading system of a near-field optical memory, a record medium in a disk-like shape is rotated and a surface thereof is scanned by a head. Therefore, in accordance with rotation of the record medium, vibration is caused in an in-plane direction of a principal face (direction in parallel with the principal face) and in an out-of-plane direction (direction orthogonal to the principal face). In a recording/reading system, a head and a surface to be detected need to be proximate to each other and therefore, the vibration in the out-of-plane direction becomes important. The vibration in the out-of-plane direction is mainly caused by flatness of the principal face of the record medium, accuracy of attaching the record medium to a rotating shaft and accuracy of a bearing of the rotating shaft. Meanwhile, on the side of the head, the very small aperture or the very small protrusion needs to follow the vibration in the out-of-plane direction of the record medium.

Generally, according to a recording/reading system of a near-field optical memory, there is used a head adopting a cantilever structure having a very small aperture or a very small protrusion, when the head is operated by a contact AFM (Atomic Force Microscope), a distance detecting mechanism is needed for detecting bending of the cantilever, or, when the head is operated by cyclic contact or shear force, a distance detecting mechanism is needed for detecting a change in the frequency, an amplitude and a phase of vibration or the like. Further, there are needed a feedback circuit for feeding back a detected signal thereof and a distance changing mechanism for actively changing an interval between the cantilever and the record medium based on the feedback signal.

However, according to the above-described conventional recording/reading system of the near-field optical memory, the distance detecting mechanism, the feedback circuit and the distance changing mechanism are necessary and, therefore, there poses a problem of complicating the construction of the recording/reading system.

Hence, the invention has been carried out in view of the above-described drawbacks in the conventional art and it is an object thereof to provide a near-field optical head which a simple structure and which is capable of simplifying control of a distance between a record medium and a head.

SUMMARY OF THE INVENTION

In order to achieve the above-described object, according to an aspect of the invention, there is provided a near-field optical head characterized in comprising a slider supported by a suspension arm for providing a load, exerting a fly force by a movement thereof relative to a record medium and producing a clearance between the slider and the record medium by balancing the load with the fly force, and a cantilever extended from the slider and having a very small protrusion or a very small aperture at an end portion thereof, wherein the very small protrusion or the very small aperture is brought into contact with the record medium by flying and inclining the slider.

The near-field optical head uses a flying-head mechanism and, therefore, an active distance controlling mechanism in respect of the record medium is dispensed with. Further, by utilizing the near-field light, a resolution equal to or higher than a diffraction limit of light is achieved, there is adopted a system of bringing the very small protrusion or the very small aperture in contact with the record medium and, accordingly, fine data can be recorded and reproduced and a transmission rate of data is increased.

Further, according to another aspect of the invention, there is provided a near-field optical head characterized in comprising a slider supported by a suspension arm for providing a load, exerting a fly force by a movement thereof relative to a record medium and producing a clearance between the slider and the record medium by balancing the load with the fly force, and a cantilever having a very small protrusion or a very small aperture and extended from the slider such that when the slider is brought into a state of being in contact with the record medium, the very small protrusion or the very small aperture is brought into a state of being not in contact with the record medium, wherein when the slider is flown and inclined, the very small protrusion or the very small aperture is brought into contact with the record medium.

The near-field optical head uses the flying-head mechanism and, accordingly, an active distance controlling mechanism in respect of the record medium is dispensed with. Further, by utilizing near-field light, a resolution equal to or higher than a diffraction limit of light is achieved, there is adopted the system of bringing the very small protrusion or the very small aperture in contact with the record medium and, accordingly, fine data can be recorded and reproduced and the transmission rate of data is increased. Further, only when the slider is made to fly, the very small protrusion or the very small aperture is brought into contact with the record medium and is not brought into contact therewith in a stationary state and, accordingly, the very small protrusion or the very small aperture can effectively be protected.

Further, according to another aspect of the invention, there is provided a near-field optical head characterized in comprising a slider supported by a suspension arm for providing a load, exerting-a fly force by a movement thereof relative to a record medium and producing a clearance between the slider and the record medium by balancing the load with the fly force, and a cantilever having a very small protrusion or a very small aperture at an end portion thereof, extended from the slider and providing a height difference between the very small protrusion or the very small aperture and a bottom face of the slider, wherein when the slider is flown and inclined, the very small protrusion or the very small aperture is brought into contact with the record medium.

According to the near-field optical head, the flying-head mechanism is used and, accordingly, an active distance controlling mechanism in respect of the record medium is dispensed with. Further, by utilizing near-field light, a resolution equal to or higher than a diffraction limit of light is achieved, there is adopted the system of bringing the very small protrusion or the very small aperture into contact with the record medium and, accordingly, fine data can be recorded and reproduced and the transmission rate of data is increased. Further, by providing the height difference between the very small protrusion or the very small aperture and the bottom face of the slider, only when the slider is flown, the very small protrusion or the very small aperture is brought into contact with the record medium. Therefore, the very small protrusion or the very small aperture can effectively be protected.

Further, according to another aspect of the invention, there is provided a near-field optical head characterized in comprising a slider supported by a suspension arm for providing a load, exerting a fly force by a movement thereof relative to a record medium and producing a clearance between the slider and the record medium by balancing the load with the fly force, a cantilever extended from the slider and having a very small protrusion or a very small aperture at an end portion thereof and a moving mechanism for moving the slider in a direction orthogonal to the record medium, wherein the very small protrusion or the very small aperture is brought into contact with the record medium when the slider is made to approach the record medium by the moving mechanism and is made to fly.

The near-field optical head uses the flying-head mechanism and, therefore, an active distance controlling mechanism in respect of the record medium is dispensed with. Further, by utilizing near-field light, a resolution equal to or higher than a diffraction limit of light is achieved, there is adopted the system of bringing the very small protrusion or the very small aperture into contact with the record medium and, accordingly, fine data can be recorded and reproduced and the transmission rate of data is increased.

Further, according to another aspect of the invention, there is provided a near-field optical head characterized in comprising a slider supported by a suspension arm for providing a load, exerting a fly force by a movement thereof relative to a record medium and producing a clearance between the slider and the record medium by balancing the load with the fly force, a moving mechanism for moving the slider in a direction orthogonal to the record medium, and a cantilever having a very small protrusion or a very small aperture and extended from the slider such that the very small protrusion or the very small aperture is brought into a state of being not in contact with the record medium when the slider is brought into a state of being separated from the record medium, wherein when the slider is made to approach the record medium and is made to fly, the very small protrusion or the very small aperture is brought into contact with the record medium.

The near-field optical head uses the flying-head mechanism and, accordingly, an active distance controlling mechanism in respect of the record medium is dispensed with. Further, by utilizing near-field light, a resolution equal to or higher than a diffraction limit of light is achieved, there is adopted the system of bringing the very small protrusion or the very small aperture into contact with the record medium and, accordingly, fine data can be recorded and reproduced and the transmission rate of data is increased. Further, only when the slider is made to fly, the very small protrusion or the very small aperture is brought into contact with the record medium and, is not brought into contact therewith in other state and accordingly, the very small protrusion or the very small aperture can effectively be protected.

Further, according to another aspect of the invention, there is provided a near-field optical head in accordance with the above-described near-field optical head in which the very small aperture is formed at a contact pad provided at the end portion of the cantilever.

At present, there is known a contact system which is conducted by providing a contact pad at a bottom face of a slider (even when the slider jumps, a maximum of 10 nm of a fly amount is provided), and according to the invention, the very small aperture is formed at the contact pad. Particularly, when matching of heights of the front end of the tip and the bottom face of the slider becomes difficult, an effective constitution is constructed. Further, the tip becomes difficult to destruct with a size to a degree of the contact pad. Further, adsorption with the record medium is reduced.

Further, according to another aspect of the invention, there is provided a near-field optical head in accordance with the above-described near-field optical head wherein a plurality of the very small protrusions or the very small apertures are provided, illumination light is divided by using a monochromator and divided portions of the light are irradiated to portions of the record medium in correspondence with the respective very small protrusions or very small apertures.

In this way, when illumination light is divided by using the monochromator, multiplex formation can be constructed by a single light source. Therefore, the head size can be made compact.

DETAILED DESCRIPTION OF THE PREFERRED EMBODIMENTS

A detailed explanation will be given of the invention in reference to the drawings as follows. Further, the invention is not limited by the described embodiments.

Embodiment 1

Figure 1:
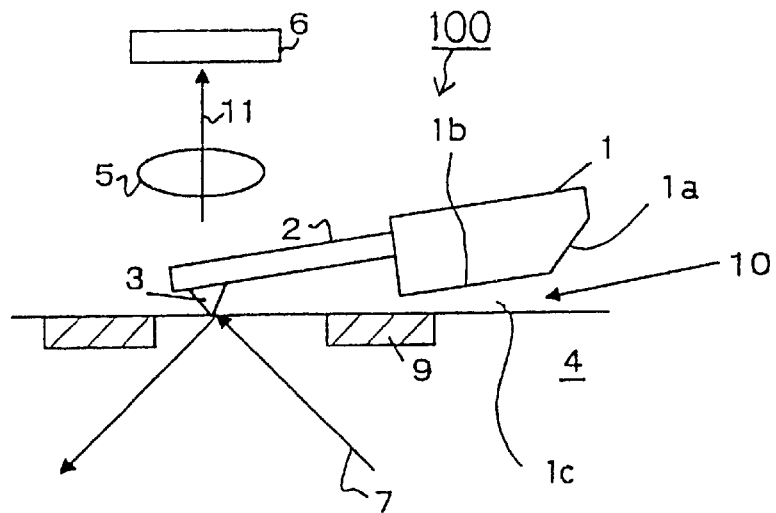
FIG. 1 is an outline constitution view showing a near-field optical head according to Embodiment 1 of the invention.

FIG. 1 is an outline constitution view showing a near-field optical head 100 according to Embodiment 1 of the invention. More specifically, FIG. 1 shows a sectional structure of a record medium and an attitude of a head in making access to the record medium. A slider 1 is supported by a support member or suspension arm (illustration is omitted). A fly head mechanism is constituted by the suspension arm and the slider 1. The suspension arm is pivoted centering on a pivoting shaft with a voice coil motor (illustration is omitted) as a drive source. A taper 1a is provided in a scanning direction of the slider 1. A flow path 1c in a shape of a wedge film is formed by the taper 1a, a bottom face 1b of the slider and a surface of a record medium 4. The slider 1 is applied with load directed to a side of the record medium 4 by the suspension arm and a gimbal spring. The slider 1 is positioned on a track of the record medium 4 by seek control and following control.

A cantilever 2 is extended from the slider 1 along the scanning direction. Further, the cantilever 2 is provided with a small protrusion tip 3 at its front end. The tip 3 is sharpened to constrict by a sharpening treatment. Therefore, the cantilever 2 is difficult to adsorb to the record medium 4. Further, there is a height difference between the tip 3 and the bottom face 1b of the slider. The cantilever 2 is formed integrally with the slider 1 by an Si process. When the cantilever 2 and the slider 1 are integrally formed by the Si process, a height between the bottom face 1b of the slider and the tip 3 can finely be controlled. Therefore, even with the very sharp tip 3, its front end is not destructed.

The surface of the record medium 4 is formed with bits 9. A light source (illustration is omitted) for generating a left is arranged at a rear face of the record medium 4. Further, although according to the example, there is shown a case of collection by total reflection, there may be used a case which does not use total reflection (dark field illumination or the like) or illumination. Further, a condenser lens 5 and a light detecting element 6 are arranged above the cantilever 2. The light detecting element 6 is connected to a signal processing system (illustration is omitted) for processing a photoelectrically converted signal.

Figure 2:
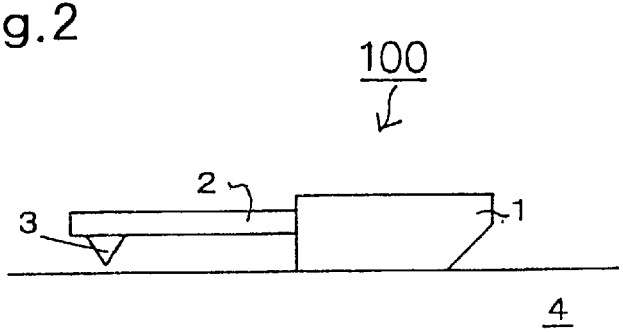
FIG. 2 is an explanatory view showing a state in which a record medium is not rotated.
Figure 3:
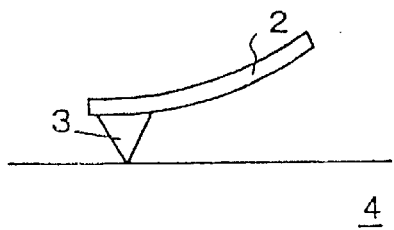
FIG. 3 is an explanatory view showing a contact state of a tip.
Figure 4:
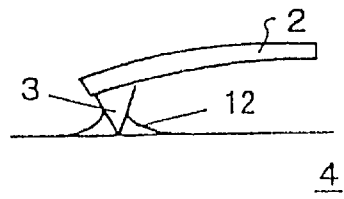
FIG. 4 is an explanatory view showing a contact state of a tip.

Next, an explanation will be given of operation of the near-field optical head 100. When the record medium 4 is not rotated, the slider 1 does not fly up but is grounded on the record medium 4. Under the state, as shown by FIG. 2, the cantilever 2 is not brought into contact with the record medium 4. Next, when air 10 above the surface of the record medium 4 is pushed into the flow path 1c in the shape of the wedge film by rotating the record medium 4, pressure is generated at the flow path 1c and the slider 1 is flown (i.e., the slider 1 is displaced upward as viewed in FIG. 1). Thus, the taper 1a and the bottom face 1b of the slider 1 define an air bearing surface which experiences a fluid air flow that generates the pressure at the flow path 1c and provides sufficient lift force to fly the slider 1 above the rotating record medium 4. Meanwhile, the slider 1 is applied with the load by the suspension arm. The load and the fly pressure are balanced and the flow path 1c is produced between the slider 1 and the record medium 4. The slider 1 is flown inclinedly and therefore, the tip 3 of the cantilever 2 is brought into contact with the record medium 4. The contact may be brought into a state in which the tip 3 is pressed to attach to the record medium 4 as shown by FIG. 3 or a state in which the tip 3 is attracted by an adsorbing layer 12 of the surface of the record medium 4 as shown by FIG. 4. However, in the case of pressing to attach the tip 3, the smaller the load the more preferable.

Near-field light is generated at the surface of the record medium 4 by illumination of light 7 by the light source. When the slider 1 is flown and the tip 3 of the cantilever 2 is brought into contact with the record medium 4, the near-field light is scattered and propagating light 11 is generated. The propagating light 11 is condensed by the condenser lens 5 and is received by the light detecting element 6. The intensity or other state of the propagating light 11 is changed by presence or absence of the bit 9 and, therefore, in accordance therewith, the intensity of the photoelectrically converted signal is changed. According to the signal processing system, the intensity of the signal is subjected to data conversion and information on the record medium is reproduced.

Further, in respect of a length and a thickness of the cantilever 2 (corresponding to spring constant), the spring constant is set to be small based on the height difference between the bottom face 1b of the slider and the tip 3, an inclination of the slider 1 when the slider is flown, and so on such that the tip is not destroyed even in the contact state. Further, a mass of the cantilever 2 is reduced and the response speed is increased.

As mentioned above, according to the near-field optical head 100, the cantilever 2 is supported by the slider 1 and therefore, a large portion of out-of plane vibration components produced by rotating the record medium 4 is absorbed by the suspension arm. Further, vibration components of the cantilever 2 which are oscillated by, for example, very small recesses and protrusions of the surface of the record medium and vibration of the slider 1 and which cannot be absorbed by the side of the slider 1, can be absorbed by a contact mode. Therefore, an active distance changing mechanism as in the conventional case is dispensed with. Further, the cantilever 2 can be made to follow the surface of the record medium 4 by a simple constitution. Further, the cantilever adopts a system of being brought into contact with the record medium and accordingly, recording and reproducing of fine data can be carried out and a transmission speed of data is increased.

Further embodiment although according to the above-described, the very small protrusion or trip is formed at the front end of the cantilever, there may be used a so-to-speak cantilever with a very small aperture in which an aperture is perforated in a normal AFM cantilever.

Embodiment 2

Figure 5:
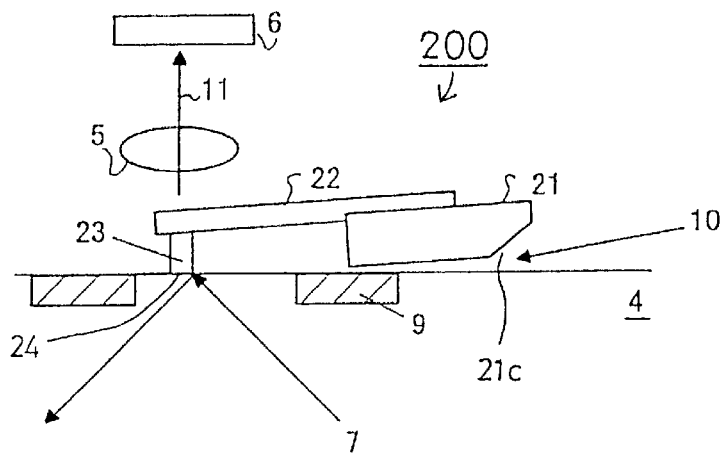
FIG. 5 is an outline constitution view showing a near-field optical head according to Embodiment 2 of the invention.

FIG. 5 is an outline constitution view showing a near-field optical head according to Embodiment 2 of the invention. The near-field optical head 200 according to Embodiment 2 is characterized in installing a contact pad 23 having a very small aperture 24 at a front end of a cantilever 22. The remaining construction is similar to the near-field optical head 100 according to Embodiment 1 and therefore, an explanation of such construction will be omitted. The contact pad 23 is installed at a front end of the cantilever type optical probe (hereinafter, simply referred to as "cantilever") 22 extended from a slider 21. The contact pad 23 is formed in a shape used in a contact slider of HDD. When the slider 21 is made of ceramic, the slider and a tip are separately formed and matching of heights of these components becomes difficult. Therefore, a tip is brought into contact with a record medium in a state in which the tip is pushed to the record medium and the tip may be destroyed, however, the destruction can be prevented by using the contact pad 23 having the very small aperture 24.

Figure 6:
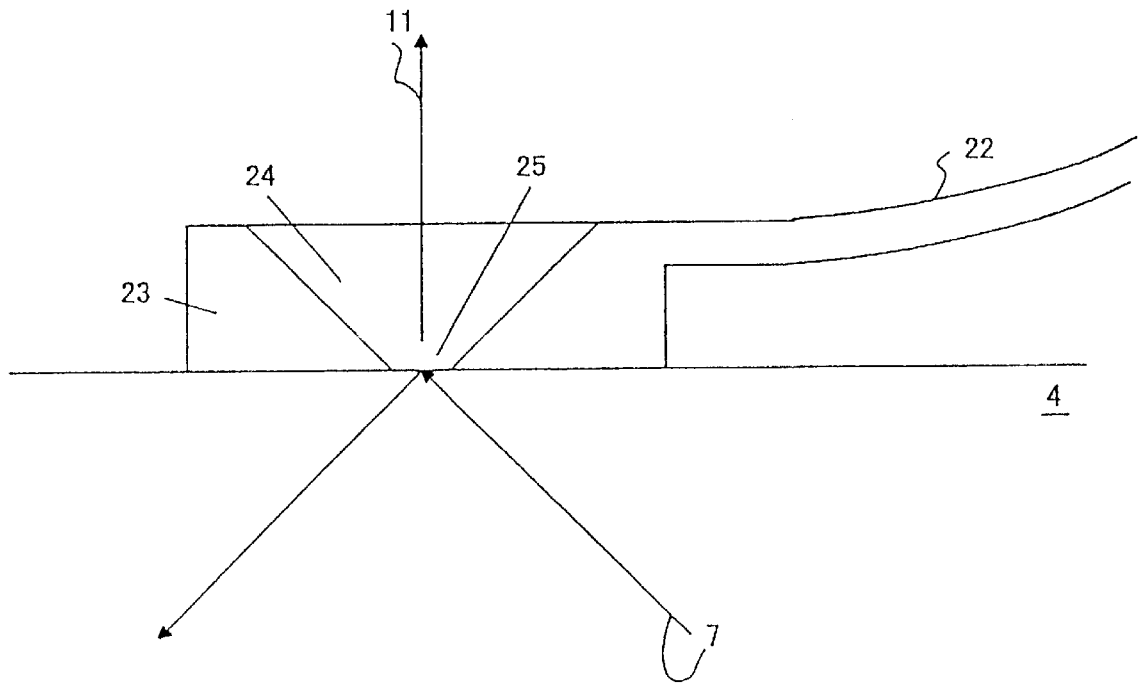
FIG. 6 is an enlarged sectional view showing a very small aperture shown by FIG. 5.

The very small aperture 24 is formed at a front end of the contact pad 23. FIG. 6 is an enlarged sectional view showing the very small aperture 24. The very small aperture 24 is formed by anisotropic etching. The very small aperture 24 is formed in a shape of a funnel and is provided with an aperture portion 25 at its bottom. Further, it is preferable to reduce an area of the front end of the contact pad 23 for preventing the front end from being adsorbed to the record medium 4. On the other hand, the front end needs an area capable of being pulled by an adsorbing layer to follow recesses and protrusions of the record medium 4. Further, when the spring constant (pressing force) of the cantilever is small, the front end is difficult to wear, however, when the spring constant is excessively small the cantilever jumps by recesses and protrusions of the record medium 4 and accordingly, a spring constant suitable for satisfying the two conditions needs to be set.

Next, an explanation will be given of operation of the near-field optical head 200. When the record medium 4 is not rotated, the slider 21 does not fly but is grounded onto the record medium 4. Under this state, the contact pad 23 is not brought into contact with the record medium 4. Next, when the air 10 on the surface of the record medium 4 is pushed into a flow path 21c in a shape of a wedge film by rotating the record medium 4, pressure is generated at the flow path 21c and the slider 21 is flown. Meanwhile, the slider 21 is applied with load by a suspension arm (illustration is omitted). The load and the fly pressure are balanced and the flow path 21c is produced between the slider 21 and the record medium 4. The slider 21 is inclinedly flown and therefore, the contact pad 23 having the very small aperture 24 is brought into contact with the record medium 4. In this case, it is necessary to promote the reliability of the contact pad 23 and the wear can substantially be nullified by optimally setting the suspension load or the mass of the pad.

The near-field light is generated at the surface of the record medium 4 by illumination of the light 7 by the light source. When the slider 21 is flown and the very small aperture 24 is brought into contact with the record medium 4, the near-field light is scattered and the propagating light 11 is generated. The propagating light 11 is condensed by the condenser lens 5 and is received by the light detecting element 6. The intensity of the propagating light 11 and other state are changed by presence or absence of the bit 9 and therefore, in accordance therewith, the intensity of the photoelectrically converted signal is changed. The signal processing system reproduces information on the record medium by subjecting the intensity of the signal into data conversion.

The cantilever 22 having the contact pad 23 may be formed with a waveguide path or may be integrated with a light source, a light detecting element, a condensing system and so on and can be structured as a head capable of recording and reproducing data. Further, when a cantilever integrated with a waveguide path, a light source and so on is used, a multiplex formation can be constituted. By the multiplex formation, recording and reproducing of a plurality of routes can simultaneously be carried out.

Figure 7:
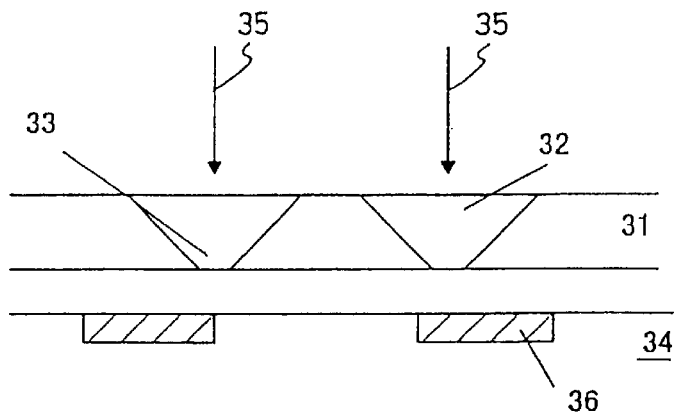
FIG. 7 is an outline constitution view showing a constitution example when a head is brought into a multiplex formation.

A multiplex near-field optical head can be realized by a constitution shown by FIG. 7. That is, a plurality of very small apertures 32 and very small apertures 33 in a shape of a funnel shown by FIG. 6 are formed at a contact pad 31 and light sources (illustration is omitted) are arranged above the respective very small apertures 32. By irradiating light 35 from the light sources to the very small apertures, near-field light is generated at a surface of a record medium 34. By scattering the near-field light, propagating light is provided, the propagating light is received by light detecting elements (illustration is omitted) arranged below the record medium 34 and recorded information is reproduced by a change in the intensity of the propagating light by a bit 36.

Embodiment 3

Figure 8:
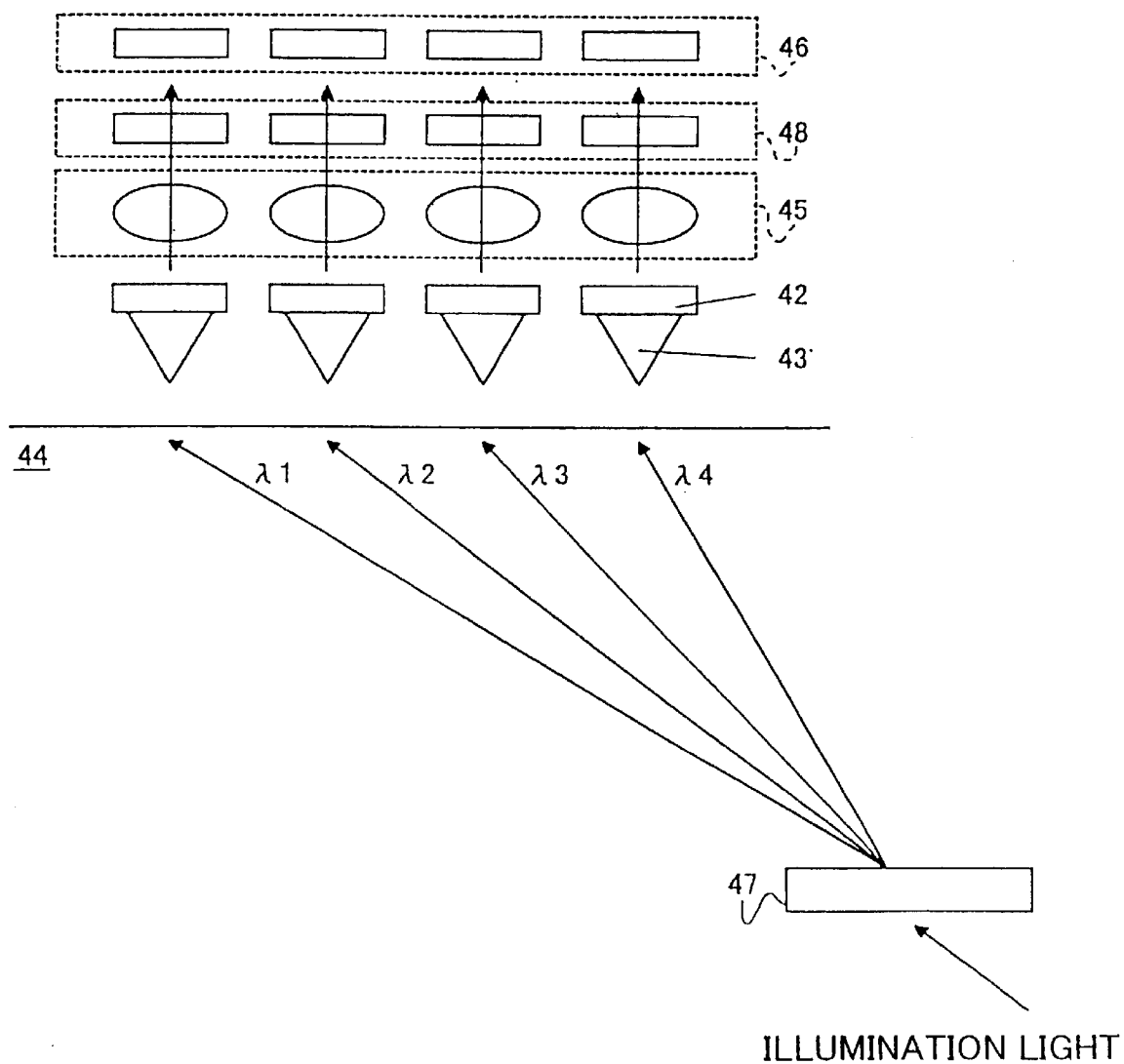
FIG. 8 is an outline constitution view showing a near-field optical head according to Embodiment 3 of the invention.

The above-described multiplex formation of a head can be realized also by the following constitution. FIG. 8 shows an outline constitution of such a multiplex head. A plurality of tips 43 are formed at front ends of a plurality of corresponding cantilevers 42. The respective cantilevers 42 are extended from a slider (illustration is omitted). The slider is flown based on the principle of fluid lubrication similar to FIG. 1. By inclinedly flying the slider, the respective tips 43 are simultaneously brought into contact with a surface of a record medium 44. An array of respective lenses 45 is installed above the respective cantilevers 42. The lens array 45 individually condenses scattered light provided at the respective tips 43 and guides the scattered light to an array of optical filters 48. Light which has passed through the optical filter array 48 is received by an array of light detecting elements 46.

Illumination light is divided into portions of light having wavelengths of 21 through 24 by a monochromator 47. The divided portions of light having the respective wavelengths are irradiated to portions of a rear face of the record medium 44 in correspondence with the respective tips 43. Further, the monochromator 47 uses, for example, gratings, a triangular prism or the like. The optical filter array 48 transmits only portions of light having wavelength components of the wavelengths 21 through 24. Accordingly, the respective light detecting elements can receive only scattered light in correspondence with the respective tips 43. As mentioned above, when a multiplex head is constituted by using the monochromator 47, it is not necessary to install light sources for respective tips and therefore, the constitution can be unified comparatively compactly.

Embodiment 4

According to the above-described embodiments, by flying and inclining the slider, the sharp tip or the contact pad is brought into contact with the record medium and when the slider is not flown but stays stationary, the tip or the contact pad is separated from the record medium. The method of controlling contact and noncontact of the tip or the contact pad to and from the record medium can be realized not only by utilizing the inclination produced by flying the slider but also by other method.

Figure 9:
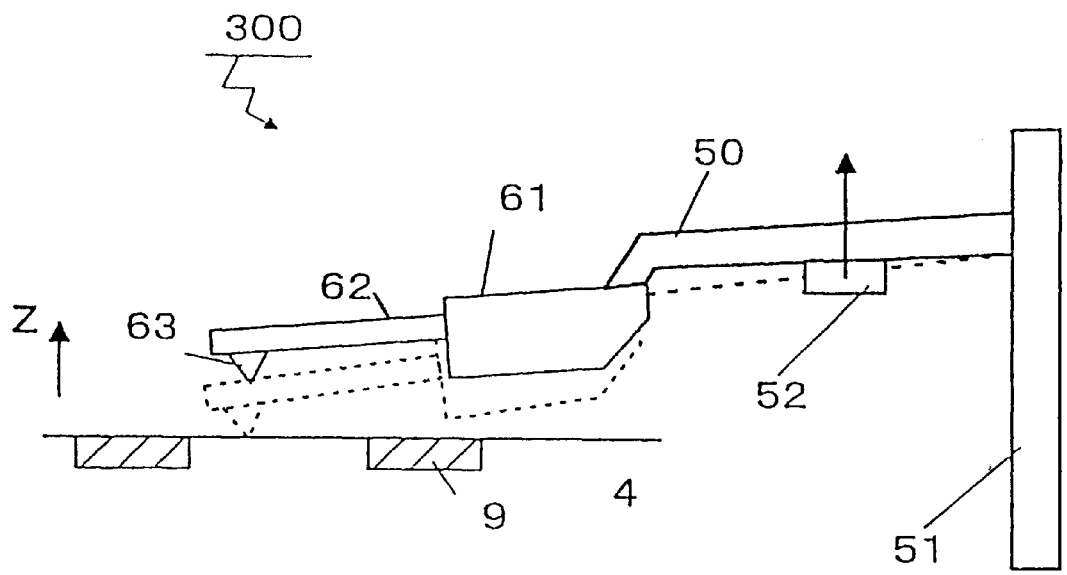
FIG. 9 is an outline constitution view showing a near-field optical head according to Embodiment 4 of the invention.

FIG. 9 is an outline constitution view showing a near-field optical head according to Embodiment 4 of the invention. The near-field optical head 300 according to Embodiment 4 is characterized in installing a z-direction moving mechanism 52 for moving a suspension arm 50 in a direction orthogonal to the record medium 4. The remaining construction thereof is the same as that of the near-field optical head too according to Embodiment 1 and therefore, an explanation of such construction will be omitted.

Next, an explanation will be given of operation of the near-field optical head 300. When the record medium 4 is rotated, by the z-direction moving mechanism 52, a slider 61 connected to the suspension arm 50 is brought into a state of being proximate to the record medium 4 and the slider 61 is flown similar to Embodiment 1. At this occasion, a tip 63 provided at a front end of a cantilever 62 extended from the slider 61 is necessarily brought into contact with the record medium 4 by providing a height difference between the tip 63 and the bottom face of the slider 61. However, the spring constant of the cantilever 62 is sufficiently soft and accordingly, the tip 63 is not destroyed.

Further, when the record medium 4 is not rotated, by the z-direction moving mechanism 52, the slider 61 connected to the suspension arm 50 is brought into a state of being separated from the record medium 4 and the tip 63 and the slider 61 are separated from the record medium 4. Therefore, the tip 63 or the slider 61 is not adsorbed to the record medium 4.

In this way, by the z-direction moving mechanism, contact and noncontact of the tip 63 to and from the record medium can be controlled, as a result, when the slider 61 is flown, similar to the description in Embodiment 1, the tip 63 can be brought into a state of being brought into contact with the record medium without being destructed. Further, in the stationary state, the slider 61 and the tip 63 can be maintained in a state of being separated from the record medium 4 and accordingly, adsorption of the slider 61 or the tip 63 to the record medium 4 or destruction thereof can be prevented.

In this case, the near-field optical head 300 is not limited to the case in which the tip 63 is formed at a vicinity of the front end of the cantilever 62, but may naturally be formed with a contact pad in place of the tip 63 as described for Embodiment 2.

Figure 10:
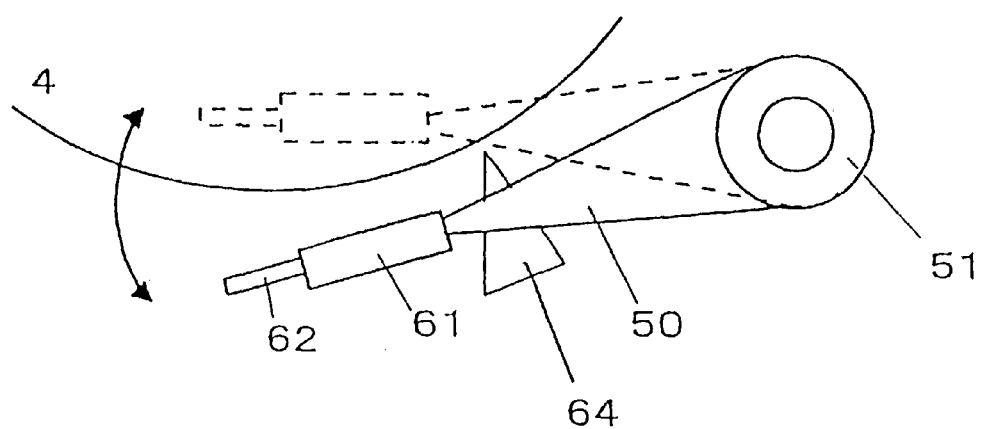
FIG. 10 is a outline constitution view showing movement of the near-field optical head according to Embodiment 4 of the invention in a horizontal direction.

Further, as the z-direction moving mechanism 52 for moving the suspension arm 50 orthogonally to the record medium 4, as shown by FIG. 10, there may be constructed a constitution in which when the slider 61 is moved in a radius direction of the record medium 4 centering on a rotating shaft 51, the slider 61 is moved also in the orthogonal direction by a guide or the like. For example, when the slider 61 is separated from the record medium 4 in the radius direction (state of solid lines), the slider 61 is separated from the record medium 4 in the orthogonal direction by a guide 64. Conversely, when the slider 61 approaches in the radius direction of the record medium 4 (state of dotted lines), the slider 61 approaches the record medium 4 in the orthogonal direction by the guide 64.

Further, although according to the above-described respective embodiments, an explanation has been given of a point in which in respect of a variation in the out-of-plane direction of the record medium, there is provided no active mechanism of controlling the distance between the head and the record medium, the invention does not totally exclude a case in which such a mechanism is combined with a head as an assisting role. Other than that, according to the above-described embodiments, an explanation has been given of various means, members or structures in a limited way, they can be suitably modified or changed within a designable range of the skilled person.

INDUSTRIAL APPLICABILITY

As has been described above, according to the near-field optical head of the invention, the cantilever is installed to the slider constituting the flying-head mechanism and accordingly, an active distance controlling mechanism in respect of a record medium is dispensed with. Further, by utilizing near-field light, a resolution equal to or higher than a diffraction limit of light is achieved, there is adopted the system of bringing the very small protrusion or the very small aperture into contact with the record medium and accordingly, fine data can be recorded and reproduced and a transmission rate of data is increased.

Further, according to the near-field optical head of the invention, the cantilever is provided to the slider constituting the flying-head mechanism and therefore, an active distance controlling mechanism in respect of a record medium is dispensed with. Further, by utilizing near-field light, a resolution equal to or higher than a diffraction limit of light is achieved, there is adopted the system of bringing the very small protrusion or the very small aperture into contact with the record medium and accordingly, fine data can be recorded and reproduced and transmission rate of data is increased. Further, the cantilever is not in contact with the record medium in a state in which the slider stays stationary and accordingly, the very small protrusion or the very small aperture at the front end can effectively be protected.

Further, according to the near-field optical head of the invention, the height difference is provided between the very small aperture and the bottom face of the slider and therefore, only when the slider is flown, the very small protrusion or the very small aperture is brought into contact with a record medium. Therefore, the very small protrusion or the very small aperture can effectively be protected. Further, by combining near-field light with the flying-head mechanism similar to the above-described, an active distance controlling mechanism in respect of the record medium is dispensed with and the transmission rate of data is increased.

Further, according to the near-field optical head of the invention, there is provided the moving mechanism for moving the suspension arm in the direction orthogonal to a record medium and accordingly, only when the suspension arm is made to approach the record medium, the very small protrusion or the very small aperture is brought into contact with the record medium. Therefore, the very small protrusion or the very small aperture can effectively be protected. Further, by combining near-field light with the flying-head mechanism similar to the above-described, an active distance controlling mechanism in respect of the record medium is dispensed with and the transmission rate of data is increased.

Further, according to the near-field optical head of the invention, in a state in which the suspension arm is separated from a record medium, the very small protrusion or the very small aperture is not brought into contact with the record medium and the very small protrusion or the very small aperture at the front end can effectively be protected. Further, only when the suspension arm is made to approach the record medium, the very small protrusion or the very small aperture is brought into contact with the record medium. Therefore, by combining near-field light with the flying-head mechanism similar to the above-described, an active distance controlling mechanism in respect of the record medium is dispensed with and the transmission rate of data is increased.

Further, according to the near-field optical head of the invention, the very small aperture is formed at the contact pad installed at an end portion of the cantilever and accordingly, the tip is difficult to destruct. Further, the tip is less adsorbed to the record medium. Particularly when matching of heights of the front end of the tip and the bottom face of the slider becomes difficult, an effective constitution is constructed.

Further, according to the near-field optical head of the invention, a plurality of very small protrusions or very small apertures are installed, illumination light is divided by using the monochromator and the divided portions of light are irradiated to portions of the record medium in correspondence with the above-described respective very small protrusions or very small apertures and accordingly, the multiplex formation can be constructed by a single light source. Therefore, the head size can be made compact.

What is claimed is:

1. A head support assembly comprising:
a near-field optical head having a slider body, a cantilever arm extending from the slider body, and a contact pad extending from an end portion of the slider body for contacting a surface of a record medium having a rotating state in which the record medium undergoes rotation and a non-rotating state in which the record medium does not undergo rotation;
support means for supporting the slider body over a surface of the record medium and for applying a loading force to urge the slider body to diverge the contact pad away from the surface of the record medium in the non-rotating state of the record medium; and
air bearing means for interacting with a film of air moving in a direction adjacent to the surface of the record medium and for generating a lift force to counteract the loading force applied by the support means, fly the slider body over the surface of the record medium, and urge the contact pad into contact with the surface of the record medium in the rotating state of the record medium.

2. A head support assembly according to claim 1; wherein the contact pad of the cantilever arm has an aperture.

3. A head support assembly according to claim 1; wherein the contact pad has an aperture which overlies the surface of the record medium when the contact pad is urged into contact with the surface of the record medium.

4. A head support assembly according to claim 1; wherein the air bearing means includes means defining a flow path between the slider body and the surface of the record medium when the slider body is flown over the surface of the record medium.

5. A head support assembly according to claim 4; wherein the air bearing means comprises a lower surface of the slider body confronting the surface of the record medium when the slider body is flown, and a tapered surface of the slider body extending from the lower surface.

6. A head support assembly according to claim 1; wherein the air bearing means comprises a lower surface of the slider body confronting the surface of the record medium when the slider body is flown, and a tapered surface of the slider body extending from the lower surface.

7. A head support assembly comprising: a near-field optical head having a slider body and a cantilever arm extending from the slider body and having a terminal end portion; support means for supporting the slider body over a surface of a record medium and for applying a loading force to urge the slider body to diverge the terminal end portion of the cantilever arm away from the surface of the record medium; and air bearing means for interacting with a film of air moving in a direction adjacent to the surface of the record medium and for generating a lift force to counteract the loading force applied by the support means, fly the slider body over the surface of the record medium, and urge the terminal end portion of the cantilever arm into contact with the surface of the record medium; wherein the support means includes means for applying the loading force to urge the slider body into contact with the surface of the record medium when the slider body is not flown so that the terminal end portion of the cantilever arm does not contact the surface of the record medium.

8. A head support assembly according to claim 7; wherein the terminal end portion of the cantilever arm comprises a protrusion.

9. A head support assembly according to claim 7; wherein the terminal end portion of the cantilever arm has an aperture which overlies the surface of the record medium when the terminal end portion of the cantilever arm is urged into contact with the surface of the record medium.

10. A head support assembly according to claim 7; wherein the terminal end portion of the cantilever arm comprises a contact pad having an aperture which overlies the surface of the record medium when the terminal end portion of the cantilever arm is urged into contact with the surface of the record medium.

11. A head support assembly according to claim 1; wherein the slider body has a lower surface for contacting the surface of the record medium when the slider body is not flown so that the terminal end portion of the cantilever arm does not contact the surface of the record medium.

12. A head support assembly according to claim 11; wherein the terminal end portion of the cantilever arm comprises a protrusion.

13. A head support assembly according to claim 11; wherein the terminal end portion of the cantilever arm has an aperture which overlies the surface of the record medium when the terminal end portion of the cantilever arm is urged into contact with the surface of the record medium.

14. A head support assembly according to claim 11; wherein the terminal end portion of the cantilever arm comprises a contact pad having an aperture which overlies the surface of the record medium when the terminal end portion of the cantilever arm is urged into contact with the surface of the record medium.

15. A head support assembly according to claim 1; wherein the contact pad of the cantilever arm extends from a terminal end portion of the cantilever arm.

16. A head support assembly comprising:
a near-field optical head having a slider body and a cantilever arm extending from the slider body and having a terminal end portion;
a support member for supporting the slider body over a surface of a record medium;
moving means for moving the slider body to a position proximate the surface of the record medium to bring the terminal end portion of the cantilever arm into contact with the surface of the record medium; and
air bearing means interacting with a film of air moving in a direction adjacent to the surface of the record medium when the slider body is positioned proximate the surface of the record medium and the terminal end portion of the cantilever arm is in contact with the surface of the record medium by the moving means for generating a lift force to counteract a loading force applied to the slider body by the support member and fly the slider body over the surface of the record medium while the terminal end portion of the cantilever arm is in contact with the surface of the record medium.

17. A head support assembly according to claim 16; wherein the terminal end portion of the cantilever arm comprises a protrusion.

18. A head support assembly according to claim 16; wherein the terminal end portion of the cantilever arm has an aperture which overlies the surface of the record medium when the terminal end portion of the cantilever arm is urged into contact with the surface of the record medium.

19. A head support assembly according to claim 16; wherein the air bearing means includes means defining a flow path between the slider body and the surface of the record medium when the slider body is flown over the surface of the record medium.

20. A head support assembly according to claim 16; wherein the terminal end portion of the cantilever arm comprises a contact pad having an aperture which overlies the surface of the record medium when the terminal end portion of the cantilever arm is urged into contact with the surface of the record medium.

21. A head support assembly according to claim 16; wherein the moving means includes means for moving the slider body to a position away from the surface of the record medium so that the terminal end portion of the cantilever arm does not contact the surface of the record medium.

22. A head support assembly according to claim 21; wherein the terminal end portion of the cantilever arm comprises a protrusion.

23. A head support assembly according to claim 21; wherein the terminal end portion of the cantilever arm has an aperture which overlies the surface of the record medium when the terminal end portion of the cantilever arm is urged into contact with the surface of the record medium.

24. A head support assembly according to claim 21; wherein the air bearing means includes means defining a flow path between the slider body and the surface of the record medium when the slider body is flown over the surface of the record medium.

25. A head support assembly according to claim 21; wherein the terminal end portion of the cantilever arm comprises a contact pad having an aperture which overlies the surface of the record medium when the terminal end portion of the cantilever arm is urged into contact with the surface of the record medium.

26. A head support assembly comprising:
  a near-field optical head having a slider body, a plurality of cantilever arms each extending from the slider body, and a plurality of contact pads each extending from an end portion of respective ones of the cantilever arms for contacting a surface of a record medium having a rotating state in which the record medium undergoes rotation and a non-rotating state in which the record medium does not undergo rotation;
  support means for supporting the slider body over a surface of the record medium having a plurality of surface portions each for receiving illumination light having a preselected wavelength, and for applying a loading force to urge the slider body to diverge the contact pads of the cantilever arms away from respective ones of the surface portions of the record medium in the non-rotating state of the record medium; and
  air bearing means interacting with a film of air moving in a direction adjacent to the surface of the record medium for generating a lift force to counteract the loading force applied by the support means, fly the slider body over the surface of the record medium, and urge the contact pads of the cantilever arms into contact with respective ones of the surface portions of the record medium in the non-rotating state of the record medium.

27. A head support assembly comprising: a near-field optical head having a slider body and a plurality of cantilever arms each extending from the slider body and having a terminal end portion; support means for supporting the slider body over a surface of a record medium having a plurality of surface portions each for receiving illumination light having a preselected wavelength, and for applying a loading force to urge the slider body to diverge the terminal end portions of the cantilever arms away from respective ones of the surface portions of the record medium; and air bearing means interacting with a film of air moving in a direction adjacent to the surface of the record medium for generating a lift force to counteract the loading force applied by the support means, fly the slider body over the surface of the record medium, and urge the contact pads of the cantilever arms into contact with respective ones of the surface portions of the record medium; wherein the support means includes means for applying the loading force to urge the slider body into contact with the surface of the record medium when the slider body is not flown so that the terminal end portions of the cantilever arms do not contact respective ones of the surface portions of the record medium.

28. A head support assembly comprising: a near-field optical head having a slider body and a plurality of cantilever arms each extending from the slider body and having a terminal end portion; support means for supporting the slider body over a surface of a record medium having a plurality of surface portions each for receiving illumination light having a preselected wavelength, and for applying a loading force to urge the slider body to diverge the terminal end portions of the cantilever arms away from respective ones of the surface portions of the record medium; and air bearing means interacting with a film of air moving in a direction adjacent to the surface of the record medium for generating a lift force to counteract the loading force applied by the support means, fly the slider body over the surface of the record medium, and urge the contact pads of the cantilever arms into contact with respective ones of the surface portions of the record medium; wherein the slider body has a lower surface for contacting the surface of the record medium when the slider body is not flown so that the terminal end portions of the cantilever arms do not contact respective ones of the surface portions of the record medium.

29. A head support assembly comprising:
  a near-field optical head having a slider body and a plurality of cantilever arms each extending from the slider body and having a terminal end portion;
  a support member for supporting the slider body over a surface of a record medium having a plurality of surface portions each for receiving illumination light having a preselected wavelength;
  moving means for moving the slider body to a position proximate the surface of the record medium to bring the terminal end portions of the cantilever arms into contact with respective ones of the surface portions of the record medium; and
  air bearing means interacting with a film of air moving in a direction adjacent to the surface of the record medium when the slider body is positioned proximate the surface of the record medium and the terminal end portions of the cantilever arms are contacted with respective ones of the surface portions of the record medium by the moving means for generating a lift force to counteract a loading force applied to the slider body by the support member and fly the slider body over the surface of the record medium while the terminal end portion of the cantilever arm is in contact with the surface of the record medium.

30. A head support assembly according to claim 29; wherein the moving means includes means for moving the slider body to a position away from the surface of the record medium so that the terminal end portions of the cantilever arms do not contact respective ones of the surface portions of the record medium.

31. A head support assembly according to claim 29; wherein the terminal end portion of each of the cantilever arms comprises a contact pad having an aperture which overlies said respective one surface portion of the record medium when the terminal end portion of the cantilever arm is urged into contact with said respective one surface portion.

32. A near-field optical head comprising: a slider body; a cantilever arm extending from the slider body and having a contact pad at an end portion thereof for contacting a surface of a recording medium; and air bearing means interacting with a film of air moving in a direction adjacent to the surface of the record medium for generating a lift force to fly the slider body over the surface of the record medium and urge the contact pad of the cantilever arm into contact with the surface of the record medium.

33. A near-field optical head according to claim 32; wherein the contact pad of the cantilever arm has an aperture which overlies the surface of the record medium when the contact pad is urged into contact with the surface of the record medium.

34. A near-field optical head according to claim 32; wherein the air bearing means includes means defining a flow path between the slider body and the surface of the record medium when the slider body is flown over the surface of the record medium.

35. A near-field optical head according to claim 34; wherein the air bearing means comprises a lower surface of the slider body confronting the surface of the record medium when the slider body is flown, and a tapered surface of the slider body extending from the lower surface.

36. A near-field optical head according to claim 32; wherein the air bearing means comprises a lower surface of the slider body confronting the surface of the record medium when the slider body is flown, and a tapered surface of the slider body extending from the lower surface.

37. A near-field optical head according to claim 32; wherein the slider body has a lower surface for contacting the surface of the record medium when the slider body is not flown so that the contact pad of the cantilever arm does not contact the surface of the record medium.

38. A near-field optical head according to claim 37; wherein the contact pad of the cantilever arm has an aperture which overlies the surface of the record medium when the contact pad of the cantilever arm is urged into contact with the surface of the record medium.

* * * * *